United States Patent [19]

Lock

[11] Patent Number: 4,688,199
[45] Date of Patent: Aug. 18, 1987

[54] TRANSDUCERS AND CONTROL MEANS

[75] Inventor: Michael W. B. Lock, Bedford, England

[73] Assignee: Internationale Octrooi Maatschappij "Octropa" BV, Rotterdam, Netherlands

[21] Appl. No.: 751,952

[22] Filed: Jul. 5, 1985

[30] Foreign Application Priority Data

Jul. 6, 1984 [GB] United Kingdom ............... 8417241

[51] Int. Cl.$^4$ ............................................. H04B 1/02
[52] U.S. Cl. .................................... 367/137; 367/138; 181/0.5
[58] Field of Search ............... 367/101, 102, 137, 138; 181/142, 139, 0.5; 310/317

[56] References Cited

U.S. PATENT DOCUMENTS

| | | | |
|---|---|---|---|
| 3,626,267 | 12/1971 | Bobbitt | 318/686 |
| 4,167,753 | 9/1979 | Lynk | 367/105 |
| 4,398,275 | 8/1983 | Zehner | 367/137 |

FOREIGN PATENT DOCUMENTS 2098498 11/1982 United Kingdom .

Primary Examiner—Thomas H. Tarcza
Assistant Examiner—Daniel T. Pihulic
Attorney, Agent, or Firm—Cushman, Darby & Cushman

[57] ABSTRACT

A standing wave is produced by interaction between the outputs of a pair of ultrasonic transducers driven by respective signal generating means. A phase interlock determines the phase difference between the signals and thus is progressively changed by a control signal regulated by a digital control means operated by a program so as to produce stepwise phase differences between the transducers in a cyclically varying manner. As a result, a sequence of momentary phase changes occur between the outputs of the signal generating means so that the standing wave is caused to move at a rate dependent upon the programmed operation of the digital control means.

9 Claims, 3 Drawing Figures

TRANSDUCERS AND CONTROL MEANS

BACKGROUND OF THE INVENTION

This invention relates to an apparatus for and a method of operating a pair of ultrasonic transducers to produce a standing wave by the interaction of their outputs.

The use of the acoustic forces of ultrasonic standing waves in a fluid medium has been explored in a number of ways for controlling the movement of material suspended in the medium. To produce the standing wave, reliance has generally been placed on having the ultrasonic output of a single source directed through the medium in a chamber or other enclosed space and reflected back on itself from an end wall of the chamber, thereby producing an essentially stationary pressure pattern in a region of the chamber.

It would be desirable for many applications to give the standing wave a progressive movement, in addition or alternatively to any movement of the fluid medium. In GB No. 2 098 498A, for example, there are two opposed transducers driven by respective signal generators and a phase control of unspecified form is employed to control the phase angle between the signals from the signal generators to establish a movement of the standing wave pattern between the transducers for displacing particles transversely of a fluid flow.

In principle, the propagation of signals of different frequencies from coaxially opposed sources produces movement of the standing wave pattern along the axis of propagation at a rate dependent upon the difference between the two frequencies. In practice, to produce an appropriate rate of movement of the pattern for the control of suspended material will require a very small frequency difference because it is desirable to employ relatively high ultrasonic frequencies to control the movement of small suspended particles. This problem is intensified if it is required to produce relative movement between the different particle types having different acoustic properties, when the choice of frequency difference may be critical. To obtain a slow rate of progression of the standing wave pattern at a high ultrasonic frequency means that the change of phase per cycle is very small indeed and the problem then arises that the opposed sources can influence each other and it may be difficult or impossible to establish such very small phase changes if the two transducers tend to lock together.

It is an object of the present invention to provide an improved apparatus for and method of controlling a pair of ultrasonic transducers to produce a progressive standing wave through the interaction of their outputs.

SUMMARY OF THE INVENTION

According to one aspect of the present invention, there is provided a method of operating a pair of ultrasonic transducers to produce a moving standing wave in a fluid medium by interaction of the outputs of said transducers, wherein the transducers are driven by respective signals with an interlocked phase difference between them, and said phase difference is progressively changed by a control signal regulated by a digital control means operated by a program to produce a stepwise cyclically varying phase difference between the transducers, whereby to introduce a sequence of momentary phase changes between the transducer-driving signals and cause the standing wave to move at a rate dependent upon the programmed operation of the digital control means.

According to another aspect of the invention, there is provided apparatus for operating a pair of ultrasonic transducers to produce a moving standing wave in a fluid medium by the interaction of the outputs of said transducers, the apparatus comprising respective signal producing means for the transducers, phase control means for interlocking the outputs of the signal producing means to determine a phase difference between said outputs, a central processing unit provided with a program store and a digital-to-analogue converter for producing a cyclical voltage ramp, and means for feeding instantaneous values of said ramp as a signal to the phase control means to change the phase difference of said outputs stepwise whereby a sequence of incremental changes in phase difference is produced in dependence upon said cyclically varying voltage ramp to cause the outputs to drive the transducers at the same frequency, but causing a stepwise change in the position of the standing wave relative to the transducers.

The profile of the voltage ramp can be essentially linear, so as to produce a constant rate of change, or it can be given other forms to produce varying rates of change for particular purposes.

The invention is particularly applicable to the production of controlled movement of a standing wave generated by higher ultrasonic frequencies, e.g. from about 500 kHz upwards. There is no apparent upper frequency limit to its usefulness since other factors will usually dictate the maximum frequency for any application employing an ultrasonic standing wave.

The invention will be described in more detail, by way of example, with reference to the accompanying drawings.

DESCRIPTION OF THE PREFERRED EMBODIMENTS

Figure 1:
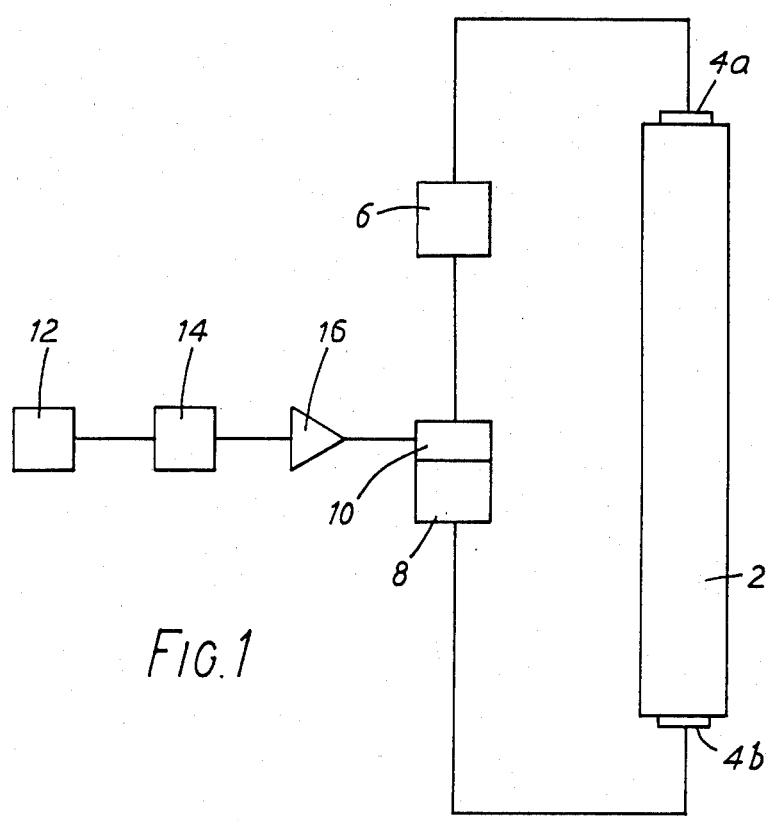
FIG. 1 illustrates schematically an apparatus according to the invention for producing a moving standing wave in a fluid medium.

The accompanying drawing illustrates schematically an apparatus according to the invention for producing a moving standing wave in a fluid medium.

The drawing shows a liquid-filled column 2 in which a particulate material suspended in the liquid is to be separated by the use of an ultrasonic standing wave. The separation process is not a part of the present invention and will not be further described here except to mention that the emissions from opposed ultrasonic transducers 4a, 4b at the ends of the column interact to generate a standing wave that moves in a controlled manner along the column so as to influence the position of the particles in dependence upon their sensitivities to the pressure gradients in the standing wave.

The transducers are operated to produce equal amplitude outputs by respective signal generators 6, 8 that have a phase interlock 10 between them determining the phase difference between the signals between the two generators. Any conventional unit giving the required output frequency (typically over 500 kHz in a liquid such as water) can be employed for one generator 6.

For the second generator 8 and the phase interlock, a suitable combined unit with most of the features required for incorporation in the present apparatus is available in the Wavetek Model 186 5 MHz Phase Lock Sweep Generator (produced by Wavetek Inc. San Diego, Calif.).

The Wavetek generator is able to produce an output waveform in a predetermined phase relationship to a reference input waveform by means of a control loop which compares the reference and output frequencies to produce a dc correction voltage intended to bring the output frequency equal to the reference frequency. The unit also comprises a dial potentiometer that can be manipulated to apply a controllable bias voltage to that correction signal so that a predetermined phase difference is maintained between the reference signal and the relative output signal.

In the present instance the first signal generator provides the reference signal for the Wavetek generator, but for all practical purposes the dial potentiometer of that unit cannot be used to produce the changing bias needed to generate a controlled movement of the standing wave.

In order to provide a suitable output for the purposes now required, the bias of the correction signal is provided by an external voltage source controlled through a microprocessor 12. By use of a suitable program, the microprocessor produces a cyclic output signal that changes in steps between minimum and maximum values over almost the complete cycle, and then returns to its starting value for the next cycle. This stepped signal is transmitted by way of a digital-analogue converter 14 to an amplifier 16 to provide the biasing voltage for controlling the phase of the output relative to the reference signal of the first generator. By generating a control cycle in which the phase difference between the reference and output signals is progressively changed between $+180°$ and $-180°$ in a series of steps over a cycle, and is returned to its starting value at the end of the cycle, the effect is achieved of producing a substantially continuous and linear phase difference change as the cycle repeats.

As a result, the two transducers are fed with driving signals having a stepwise change in phase difference, each complete cycle of incremental steps being derived from the microprocessor, so that the standing wave formed by the interaction of the two corresponding amplitude outputs from the transducers moves stepwise towards the transducer driven by the second generator, at a rate determined by its rate of change of phase lag. Similarly, if the progressive phase difference between the reference and output signals is effected between $-180°$ and $+180°$ the standing wave will move towards the transducer driven by the first generator.

As a numerical example, with a 4.2 MHz reference signal, if a steady rate of movement of 10 mm/min is required in water (sonic velocity 1484 m/s at 20° C.) the nodes of the standing wave must be displaced at a rate of 56.6 internodal distances per minute, so that the microprocessor program cycle must be completed in 1.06 seconds (1 node per control voltage cycle). Assuming the microprocessor program provides 256 voltage steps per cycle, if the linear change in voltage were to be distributed over all the 256 steps of the cycle, a phase change step would occur once every 17,390 cycles of the signal generator; in practice, the return of a control signal to its starting value at the end of a cycle is not instantaneous and it could be arranged that the microprocessor completes its full range sweep to leave the interval of a few steps remaining at the end of the cycle for return to the starting value. A significant point brought out by these figures is that for the required phase change the output voltage has a phase adjustment of less than 1.4° at substantially 17000 cycle intervals, so that the required movement of the wave is generated effectively without disturbances of the waveform.

Figure 2A:
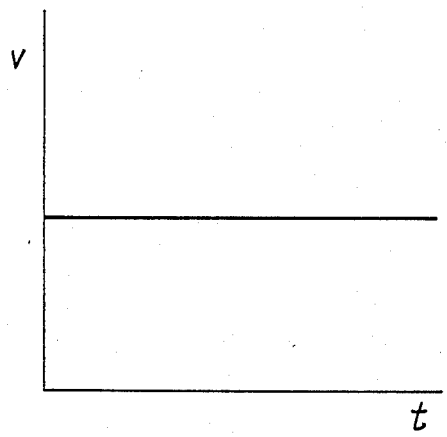
FIGS. 2a and 2b illustrate in graphical form two velocity characteristics of a moving standing wave produced by the apparatus of FIG. 1.
Figure 2B:
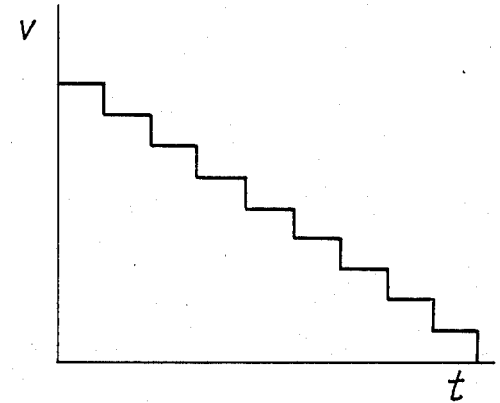

FIG. 2a illustrates the constant velocity (v) characteristic of the movement of the standing wave against time (t) obtained in the example just described. As has already been mentioned, however, other voltage ramps can be produced by storing alternative programs so as to give varying velocity characteristics, such as the cyclically stepped characteristic illustrated in FIG. 2b. The manner in which appropriate digital programs can be written to give the required characteristics will be well understood by those skilled in the art and requires no detailed illustration or explanation here.

I claim:

1. A method of operating a pair of ultrasonic transducers to produce a moving standing wave in a fluid medium by interaction of the outputs of said transducers, comprising the steps of:
   producing respective signals to drive the transducers, an interlocked phase difference existing between said respective signals;
   producing a control signal to progressively change said phase difference; and
   regulating said control signal to produce a stepwise cyclically varying phase difference between the transducers to introduce a sequence of momentary phase changes between the transducer-driving signals, to cause the standing wave to move in a manner dependent upon said regulating of said control signal.

2. A method according to claim 1 wherein said are produced control signals in the form of a cyclical ramp with an essentially instantaneous return between ending and starting ramp values of succeeding cycles.

3. A method according to claim 2 wherein said ramp is essentially linear.

4. A method according to claim 2 wherein said starting values of succeeding cycles have a phase displacement of less than 180° from the preceding ramp ending value.

5. A method according to claim 4 wherein the starting values of succeeding ramps are progressively phase-displaced.

6. A method according to claim 2 wherein said control signal ramp is non-linear so as to produce a varying rate of movement of the standing wave within each cycle.

7. A method according to claim 1 wherein the frequency of each transducer output is not substantially less than 500 kHz.

8. Apparatus for operating a pair of ultrasonic transducers to produce a moving standing wave in a fluid medium by the interaction of the outputs of said transducers, the apparatus comprising:
   signal producing means for producing driving signals for the transducers;
   phase control means for interlocking the outputs of the signal producing means to determine a phase difference between said outputs;
   central processing means, provided with a program store and a digital-to-analogue converter, for producing a cyclical voltage ramp, and means for feeding instantaneous values of said ramp as a signal to the phase control means to change the phase difference of said outputs stepwise, whereby a sequence of incremental changes of phase differences produced in dependence upon said cyclically varying voltage ramp is produced to cause the outputs to drive the transducers in the same frequency but causing stepwise changes in the position of the standing wave relative to the transducers so as to effect a progressive movement to the standing wave.

9. Apparatus according to claim 8 wherein said signal producing means are arranged to generate outputs of not substantially less than 500 kHz.

* * * * *